(No Model.)

W. S. KISINGER.
CAR AXLE.

No. 464,028. Patented Dec. 1, 1891.

Attest.
Arthur Moore
M. E. Layman

Inventor.
William S. Kisinger.
by James H. Layman.
Atty.

United States Patent Office.

WILLIAM S. KISINGER, OF BELLEVUE, KENTUCKY, ASSIGNOR TO STIEBEL, KISINGER & STIEBEL, OF CINCINNATI, OHIO.

CAR-AXLE.

SPECIFICATION forming part of Letters Patent No. 464,028, dated December 1, 1891.

Application filed November 24, 1890. Serial No. 372,457. (No model.)

*To all whom it may concern:*

Be it known that I, WILLIAM S. KISINGER, a citizen of the United States, residing at Bellevue, in the county of Campbell and State of Kentucky, have invented certain new and useful Improvements in Car-Axles; and I do hereby declare the following to be a full, clear, and exact description of the invention, reference being had to the annexed drawings, which form part of this specification.

This invention relates to compound or sectional car-axles; and my improvement comprises a specific combination of parts which affords a more secure bearing for the loose wheel of such axles than has heretofore been attainable, the details of said combination being hereinafter fully described, and then pointed out in the claim.

Figure 1:
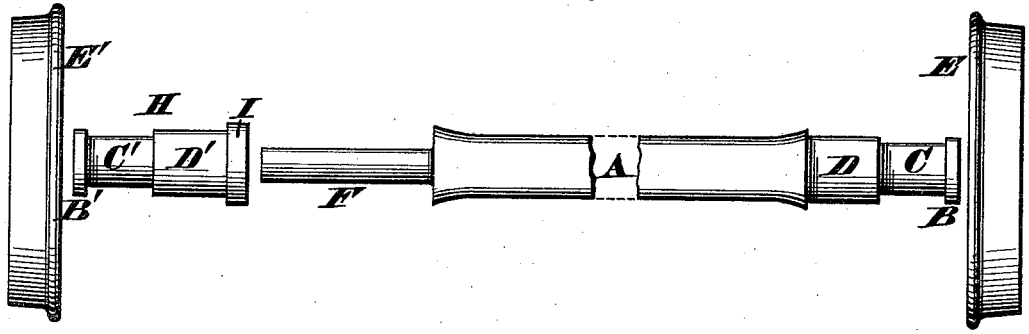
Figure 2:
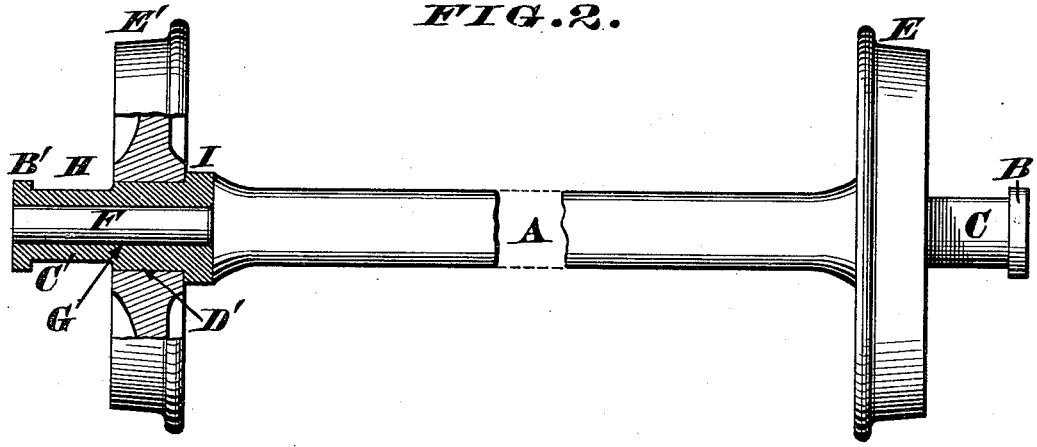

In the annexed drawings, Figure 1 is an elevation showing the various component members of my axle separated from each other, and the central part of the axle proper broken away. Fig. 2 is an enlarged sectional elevation of said members fitted together, the central part of the axle proper being broken away.

A represents the axle proper, which is of any suitable size, shape, and material, and has at one end a collar B, journal C, and hub-seat D, to which latter the wheel E is rigidly secured, so as to revolve with said axle. The opposite end of this axle has a reduced portion or spindle F, adapted to turn freely within the axial bore G of a sleeve H, of practically the same length as said spindle. Furthermore, this sleeve has a collar B', journal C', and a hub-seat D', to which latter the other wheel E' is rigidly secured, so as to revolve with said sleeve.

I is a collar at the inner end of this sleeve for the wheel-hub E' to bear against.

This compound or sectional axle is fitted together in the following manner: The wheel E is secured to hub-seat D of axle A and the other wheel is secured to hub-seat D' of sleeve H, and then the spindle F is inserted within the bore G of said sleeve. The bearings C C' are journaled in the ordinary axle-boxes, thus preventing longitudinal shifting of the two sections A and H, and producing an axle which will allow either wheel to turn independently of the other wheel. Consequently there will be less wear and tear both of the wheels and rails when a car runs round a curve. It is also apparent that this construction affords an axle which is practically as secure as though it were made of a single piece from end to end, which advantage is due to the fact that the spindle F passes completely through the sleeve H. Therefore the wheel E' is supported by the combined strength of the spindle and sleeve. It will be noticed this wheel E' bears against the annular shoulder at the junction of hub-seat D' and collar I, while the latter bears against the annular shoulder at the junction of spindle F and axle A, which arrangement of parts prevents inward movement of said wheel by its flange constantly running along the rail. Finally, I am aware it is not new to run one wheel loosely or independently of a car-axle, and, therefore, my claim is not to be construed broadly, but is expressly limited to the specific combination of parts herein shown and described.

I claim—

The car-axle A, having an integral spindle F, the sleeve H, having an outer collar B', journal C', hub-seat D', bore G, and inner collar I, and the wheel E', secured to said hub-seat D' and bearing against the annular shoulder at the junction of said hub-seat and inner collar I, which latter bears against the annular shoulder at the junction of spindle F and axle A, all as herein shown and described.

In testimony whereof I affix my signature in presence of two witnesses.

WILLIAM S. KISINGER.

Witnesses:
  JAMES H. LAYMAN,
  FRANCIS M. BIDDLE.